(12) United States Patent  
Lane

(10) Patent No.: US 6,618,324 B1
(45) Date of Patent: Sep. 9, 2003

(54) TRACK QUALITY INDICATOR WITH HYSTERESIS

(75) Inventor: Walter R. Lane, Westerly, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/241,389

(22) Filed: Sep. 11, 2002

(51) Int. Cl.[7] .................................................. G01S 3/80
(52) U.S. Cl. ......................................................... 367/124
(58) Field of Search ................................. 367/118, 124, 367/131, 907; 342/90, 62; 702/150, 151

(56) References Cited

U.S. PATENT DOCUMENTS 4,520,493 A * 5/1985 Heard et al. ................. 375/365
5,176,337 A * 1/1993 Lee ............................ 244/3.15
5,341,142 A * 8/1994 Reis et al. ..................... 342/62

* cited by examiner

Primary Examiner—Ian J. Lobo
(74) Attorney, Agent, or Firm—James M. Kasischke; Michael F. Oglo; Jean-Paul A. Nasser

(57) ABSTRACT

The apparatus and method of the present invention utilize hysteresis to provide accurate and stable track quality indicator (TQI) data. In accordance with the present invention, each TQI state has two corresponding thresholds. Specifically, each TQI state has an initial threshold that must be surpassed by an initial or first summed log likelihood ratio ($SLLR_0$) before a change in current TQI state is made to a higher TQI state, and a lower threshold below which a second $SLLR_1$ must decrease in order to effect a change in current TQI state to a lower TQI state. Thus, $SLLR_0$ is used to determine if the tracker quality indicates a low SNR track, an uncertain track or a lost track, and $SLLR_1$ is used to determine if the tracker quality indicates a strong track. In accordance with the present invention, the values of $SLLR_0$ and $SLLR_1$ and the absolute value of the smoothed tracker residual are used to generate a current TQI value.

8 Claims, 4 Drawing Sheets

TRACK QUALITY INDICATOR WITH HYSTERESIS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention generally relates to an apparatus and method for improving target track quality estimation in a passive sonar system.

(2) Description of the Prior Art

Conventional sonar systems estimate precision tracker performance qualitatively by generating a track quality indicator ("TQI"). There are four possible states for track quality (i.e., four TQI states): lost track, uncertain track, low signal-to-noise ratio ("SNR"), and strong track. The lost track state occurs when the signal strength of the tracker falls below a predetermined minimal SNR. The uncertain track state occurs when the estimated SNR is below the designed tracker threshold and/or the smoothed tracker error residual becomes large due to target dynamics. The low signal-to-noise ratio (SNR) track is declared when the estimated SNR is near the tracker design threshold and there are no significant biases induced by target dynamics. The strong track state occurs when the target SNR is significantly greater than the tracker design threshold and there are no biases induced by target dynamics.

The TQI provides information to the sonar operator and automated sonar data processing algorithms so that the status of all trackers can be monitored. Such a feature is especially important in sonar systems currently in use wherein the number of trackers is relatively large. When a lost track indication occurs, the sonar operator typically drops the track or reinitializes the tracker. An uncertain track indication occurs when the tracker is tracking, but the SNR is low and sonar operator intervention may be required. A strong track indication occurs when the tracker loop is locked and sonar operator intervention is unnecessary.

One significant disadvantage of many prior art TQI algorithms currently in use is that they exhibit instability when the tracker is near the boundary between TQI states. Such instability degrades track quality estimation.

SUMMARY OF THE INVENTION

A first object of the present invention is providing a method for indicating the quality of tracks in a passive sonar system.

Another object of the invention is providing such a method that is not overly sensitive to track status changes.

Accordingly, the present invention is directed to a method and apparatus for calculating a track quality indicator from a plurality of tracker amplitude estimates. In one embodiment, the method utilizes the track quality indicator at the previous time increment. The track quality indicator is assigned as a lost track based on a first lost track threshold if the track quality indicator at the previous time increment indicated a lost track and based on a second lost track threshold if the track quality indicator at the previous time increment indicated a different status. The track quality indicator is assigned as an uncertain track based on a first uncertain track threshold if the track quality indicator at the previous time increment indicated a lost track or an uncertain track and based on a second uncertain track threshold if the track quality indicator at the previous time increment indicated a different status. The track quality indicator is assigned as a low signal to noise ratio (SNR) track based on a first low SNR track threshold if the track quality indicator at the previous time increment indicated a strong track and based on a second low SNR track threshold if the track quality indicator at the previous time increment indicated a different status. The track quality indicator is assigned as a strong track if another track quality indicator is not assigned. The method continues to the next time increment after the track quality indicator is assigned.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

In describing the preferred embodiments of the present invention, reference will be made herein to FIGS. 1, 2A, 2B and 2C of the drawings in which like numerals refer to like features of the invention.

The apparatus and method of the present invention utilize hysteresis to provide accurate and stable TQI data. In accordance with the present invention, each TQI state has two corresponding thresholds. Specifically, each TQI state has an initial threshold that must be surpassed by an initial or first summed log likelihood ratio ($SLLR_0$) before a change in current TQI state ("TQI(k)") is made to a higher TQI state, and a lower threshold below which a second $SLLR_1$ must decrease in order to effect a change in current TQI state TQI(k) to a lower TQI state. Thus, $SLLR_0$ is used to determine if the tracker quality indicates a low, uncertain or lost track, and $SLLR_1$ is used to determine if the tracker quality indicates a strong track. In accordance with the present invention, the values of $SLLR_0$ and $SLLR_1$ and the absolute value of the smoothed tracker residual are used to generate a TQI value.

It will be appreciated that the method and apparatus of the present invention may be implemented by software programs controlling a programmable computer, or a hardware-based apparatus consisting of general purpose or custom designed integrated circuit devices, including microprocessors and memory devices containing instructions.

Figure 1:
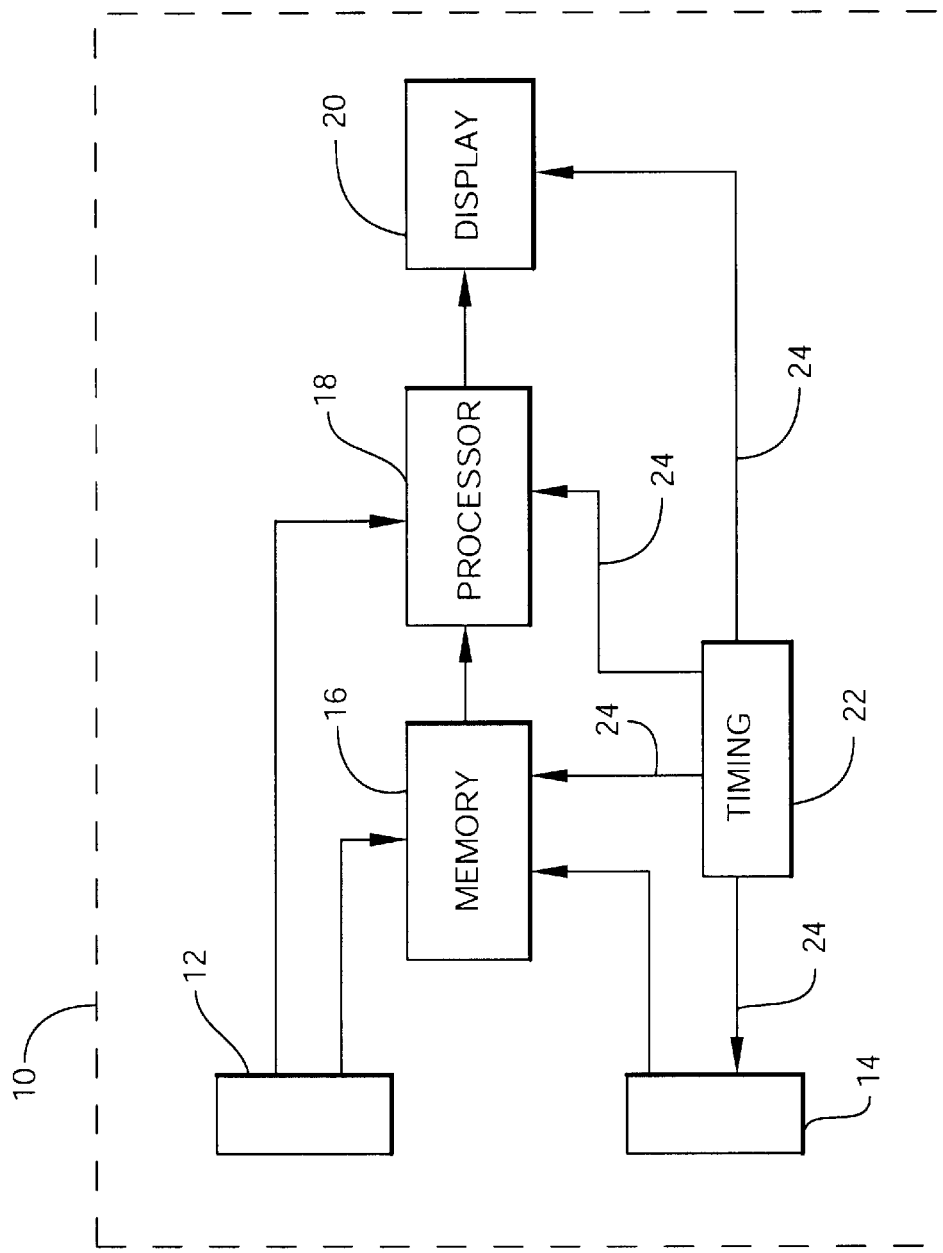
FIG. 1 is a block diagram of the apparatus of the present invention.

Referring to FIG. 1, there is shown one embodiment of apparatus 10 of the present invention. Apparatus 10 generally comprises user interface device 12, data input interface 14, memory device 16, processor 18, display device 20 and timing circuitry 22. Timing circuitry 22 outputs timing signals 24, based on the tracker update rate, which are inputted into data input device 14, memory device 16, processor 18 and display device 20. In one embodiment, user interface device 12 comprises a computer keyboard. In one embodiment, memory device 16 includes electronic data circuits such as a ROM (read-only-memory), RAM (random access memory), or EPROM (erasable programmable read-only-memory). In one embodiment, processor 18 includes a logic unit, such as an ALU (arithmetic logic unit), for performing mathematical calculations. Data input device 14 receives data from the sonar equipment that provides tracker data. Display device 20 can be realized by a display screen or a computer printer. In one embodiment, a personal computer and keyboard is used to realize user interface 12, memory device 16, processor 18 and display device 20. As described in the foregoing description, the two summed log likelihood ratios are defined as $SLLR_0$ and $SLLR_1$. $SLLR_0$ is used to determine if a low, uncertain, or lost track exists. $SLLR_1$ is used to determine if a strong track exists.

The following data is input into memory device 16 via user interface 12 and/or data input device 14 in order to effect calculation of $SLLR_0$ and $SLLR_1$:

A(k): unsmoothed tracker amplitude estimate, wherein "k" designates a point in time corresponding to the tracker update rate;

$O_i$: theoretical standard deviation of tracker amplitude estimate at $SNR_i$;

$C_i$: theoretical mean of tracker amplitude estimate at $SNR_i$ $TL_i$: minimum allowable value for $SLLR_i$ $TM_i$: maximum allowable value for $SLLR_i$ The summed log likelihood ratios (SLLRs) are calculated as follows wherein i=0,1:

$a_i(k)=A(k)/O_i$: normalized amplitude estimate at time k;

$p_i=C_i/O_i$: normalized theoretical amplitude mean;

$LLR_0(k)=p_i[a_0(k)-p_0/2]$: log likelihood ratio at time k;

$LLR_1(k)=p_1[a_1(k)-0.85p_1]$: log likelihood ratio at time k;

$SLLR_i(k)=MIN\ [SLLR_i(k-1)+LLR_i(k),\ TM_i]$;

$SLLR_i(k)=MAX\ [SLLR_i(k),\ TL_i]$;

The smoothed tracker error residual is calculated recursively to determine if the track should be classified as uncertain. The RMS (root-mean-square) tracker residual is estimated using the tracker's error detector as follows:

$$ES(k)=K[x(k)-xe(k)]+n_x(k);$$

wherein:

ES: tracker residual;

$n_x(k)$: zero mean gaussian noise;

$K=|SNR|/(1.744+|SNR|)$: error detector gain;

x(k): tracker output at time k;

xe(k): tracker estimate of x(k);

In accordance with the present invention, the summed log likelihood ratios and the absolute value of the smoothed tracker residual are compared to specified thresholds. The following predetermined thresholds are inputted into memory device 16 via user interface 12:

TL=−3.5: lost track threshold for $SLLR_0$;

TU=1.75: uncertain track threshold for $SLLR_0$;

TS=7.0: strong track threshold for $SLLR_1$;

$ERR_{max}$: uncertain track maximum residual threshold;

$$ERR_{max}=(nKE)/(2\times\Omega)+T_{err}\times SRESVAR)\times(\Omega/n\times KE)$$

wherein:

"x" denotes multiplication;

KE: tracker estimate of the error detector;

SRESVAR: tracker estimate of the smoothed residual standard deviation;

$\Omega$: effective angular center frequency;

n=0.5: constant;

$T_{err}$=3.0: constant;

SH=2.0: strong SNR hysteresis constant;

LH=1.5: low SNR hysteresis constant.

These predetermined thresholds are empirically derived as a result of testing. However, it is to be understood that other thresholds and constants can be used as well if required by the particular application.

As used herein, the term TQI(k) refers to the track quality indicator corresponding to a point in time "k" that is based on the tracker update rate. As used herein, the term TQI(k−1) refers to the track quality indicator corresponding to a point time "k−1" that is prior to "k".

Figure 2A:
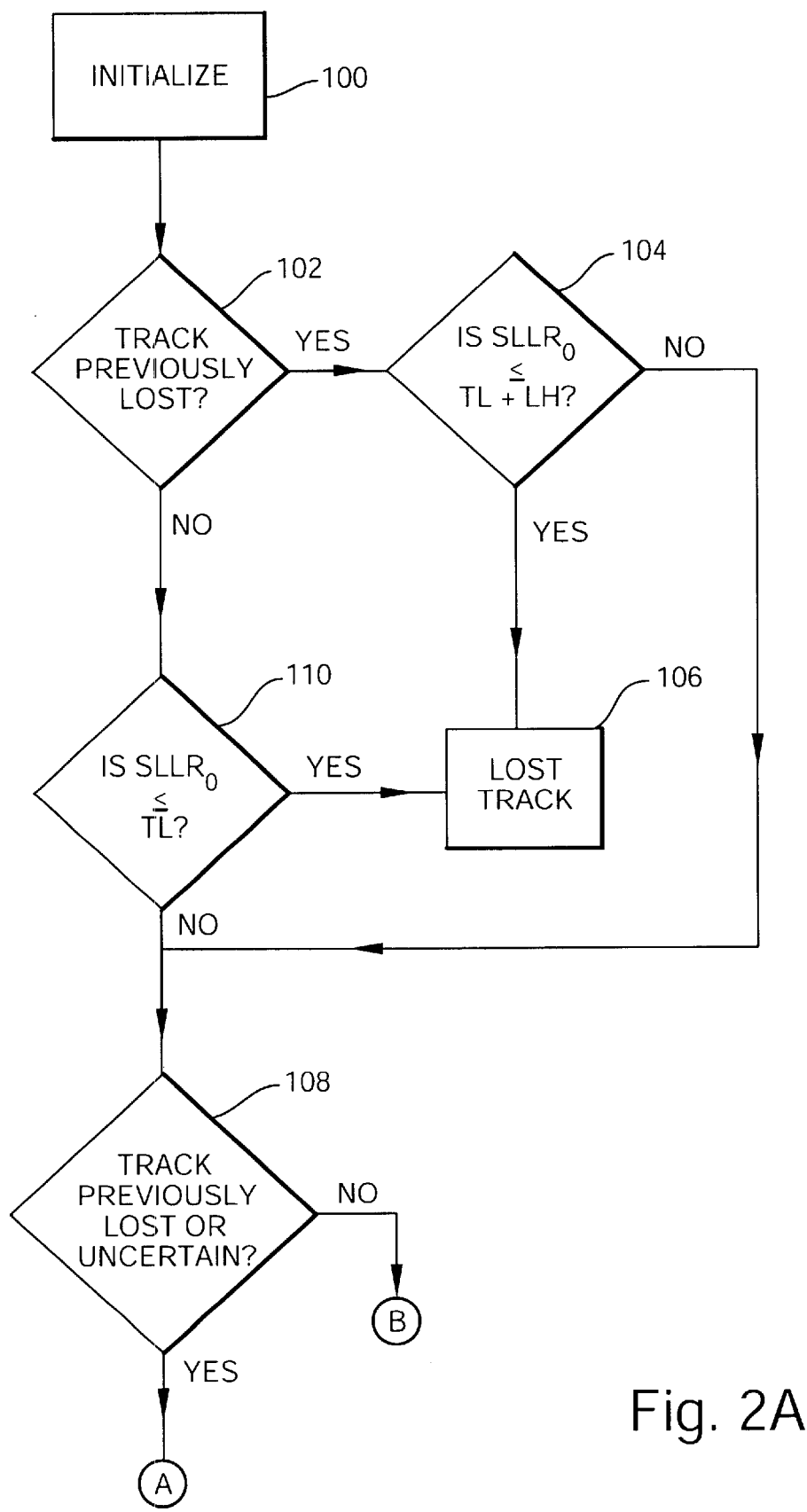
FIGS. 2A, 2B and 2C are flow sheets illustrating the steps of the method of the present invention.
Figure 2B:
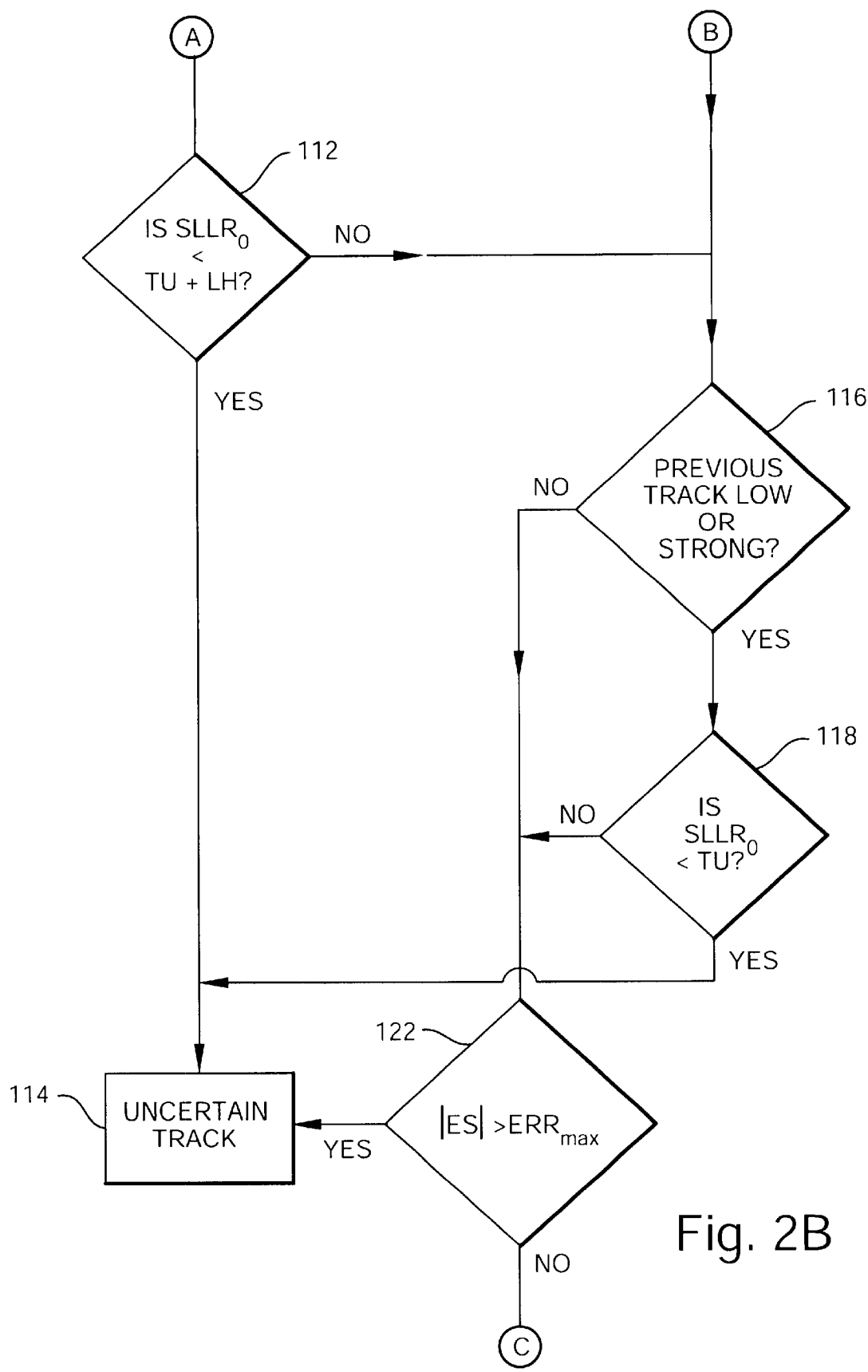
Figure 2C:
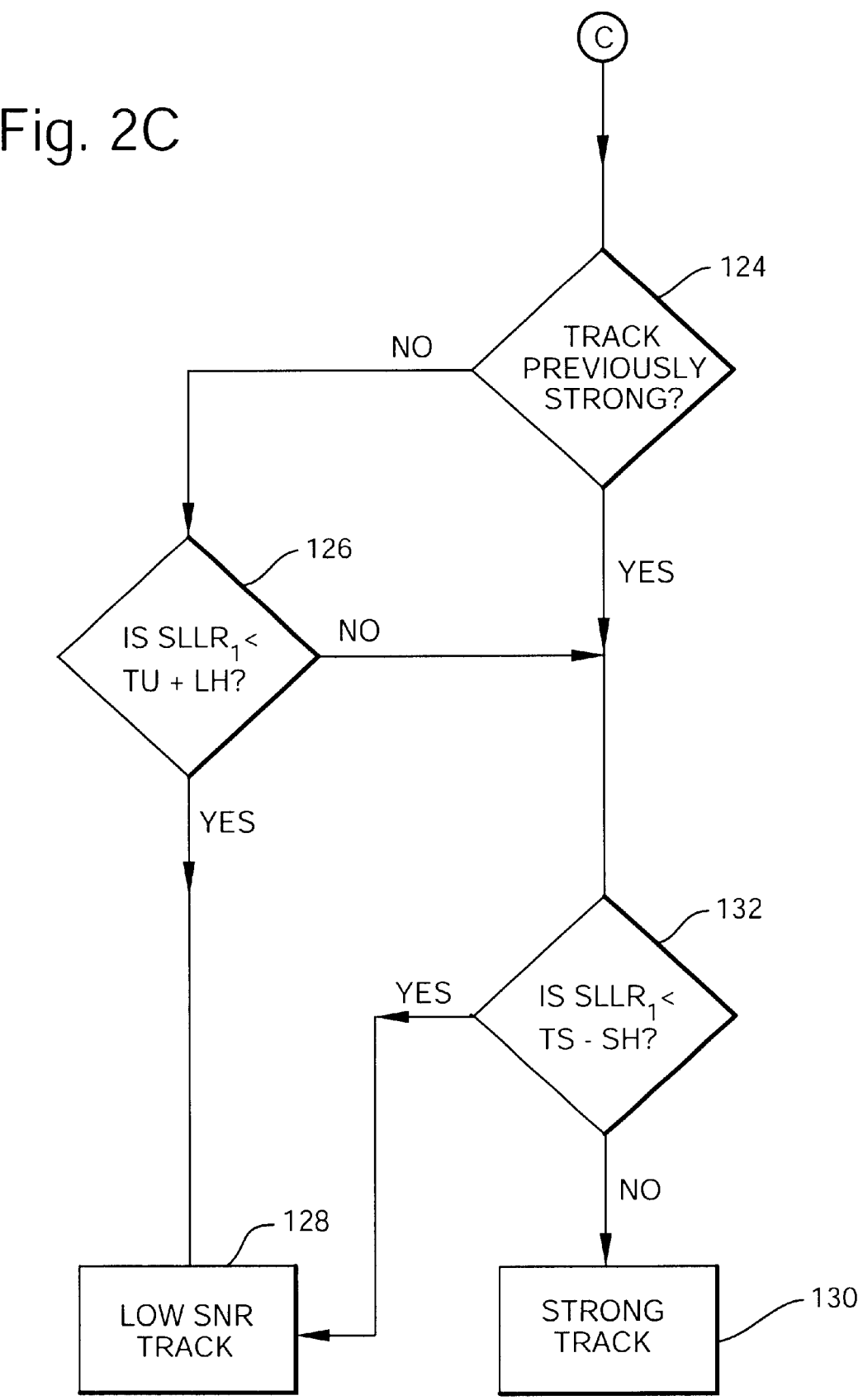

The particular steps of the method of the present invention are described in the ensuing description in conjunction with the flow sheets shown in FIGS. 2A, 2B and 2C. It is to be understood that the components of apparatus 10 are used to implement the method steps described in the ensuing description.

In step 100, the initialization step of the method, the predetermined thresholds, constants and data described above are provided into memory device 16 via user interface 12 and/or data interface device 14. Memory device 16 routes the aforementioned predetermined thresholds, constants and data to processor 18 upon the appropriate clock signals 24.

Processor 18 generates the value $SLLR_0$ for the current time value "k". Processor 18 also generates a sum value equal to the sum of the predetermined lost track threshold value TL and the predetermined low (SNR) hysteresis value LH.

In step 102, processor 18 determines if the track quality indicator value, TQI(k−1), indicates a lost track. If TQI(k−1) indicates a lost track, processor 18 proceeds to step 104 to determine if $SLLR_0$ is less than or equal to the sum of the predetermined lost track threshold value TL and the predetermined low (SNR) hysteresis value LH. If $SLLR_0$ is less than or equal to the sum of the predetermined lost track threshold value TL and the predetermined low (SNR) hysteresis value LH, processor 18 proceeds to step 106 to generate a value TQI(k) that indicates a lost track.

If in step 104, processor 18 determines that $SLLR_0$ is not less than or equal to the sum of the predetermined lost track threshold value TL and the predetermined low (SNR) hysteresis value LH, processor 18 proceeds to step 108 to determine if the value TQI(k−1) indicates an uncertain track or a lost track. Step 108 is described in the ensuing description.

If in step 102, processor 18 determines that the value TQI(k−1) does not indicate a lost track, then processor 18 proceeds to step 110 to determine if $SLLR_0$ is less than or equal to the predetermined lost track threshold TL. If processor 18 determines that $SLLR_0$ is greater than the predetermined lost track threshold TL, processor 18 proceeds to step 108 to determine if the TQI(k−1) value indicates an uncertain track or a lost track.

If in step 110, processor 18 determines that $SLLR_0$ is less than or equal to the predetermined lost track threshold TL, processor 18 proceeds to step 106 to generate a value TQI(k) that indicates a lost track.

In step 108, processor 18 determines if the value TQI(k−1) indicates an uncertain track or a lost track. If processor 18 determines that the TQI(k−1) value indicates an uncertain track or a lost track, processor 18 proceeds to step 112.

Processor 18 generates a value equal to the sum of the predetermined uncertain track threshold value TU and the predetermined low (SNR) hysteresis value LH. In step 112, processor 18 determines if $SLLR_0$ is less than the sum of the predetermined uncertain track threshold value TU and the predetermined low (SNR) hysteresis value LH. If $SLLR_0$ is less than the sum of the predetermined uncertain track threshold value TU and the predetermined low (SNR) hysteresis value LH, processor 18 proceeds to step 114 to generate a value TQI(k) that indicates an uncertain track.

If in step 108, processor 18 determines that the value TQI(k−1) does not indicate an uncertain track or a lost track, then processor 18 proceeds to step 116 to determine whether the value of TQI(k−1) indicates a low (SNR) track or a strong track. If in step 116, processor 18 determines that the value TQI(k−1) indicates either a low (SNR) track or a strong track, processor 18 proceeds to step 118 to determine if $SLLR_0$ is less than the predetermined uncertain track threshold value TU.

If in step 118, processor 18 determines that $SLLR_0$ is less than the predetermined uncertain track threshold value TU, processor 18 proceeds to step 114 to generate a value TQI(k) that indicates an uncertain track. However, if processor 18 determines that $SLLR_0$ is greater than or equal to the predetermined uncertain track threshold value TU, processor 18 proceeds to step 122 which is described in the ensuing description.

If in step 116, processor 18 determines that the value TQI(k−1) does not indicate a low (SNR) track or a strong track, processor 18 proceeds to step 122. In step 122, processor 18 determines if the absolute value of the smoothed tracker error residual ES, (i.e. |ES|), is greater than the uncertain track maximum residual threshold $ERR_{max}$. If processor 18 determines that |ES| is greater than the uncertain track maximum residual threshold $ERR_{max}$, then processor 18 proceeds to step 114 to generate a value TQI(k) that indicates an uncertain track.

If in step 122, processor 18 determines that |ES| is not greater than the uncertain track maximum residual threshold $ERR_{max}$, then processor 18 proceeds to step 124 to determine if TQI(k−1) indicates a strong track. If processor determines that TQI(k−1) does not indicate a strong track, processor 18 proceeds to step 126. Processor 18 generates a value equal to the sum of the predetermined strong track threshold value TS and the predetermined strong SNR hysteresis value SH. In step 126, processor 18 determines if $SLLR_1$ is less than the sum of the predetermined strong track threshold value TS and the predetermined strong SNR hysteresis value SH. If $SLLR_1$ is less than the sum of the predetermined strong track threshold value TS and the predetermined strong SNR hysteresis value SH, processor 18 proceeds to step 128 to generate a track quality indicator value TQI(k) that indicates a low SNR track.

If in step 126, processor 18 determines that $SLLR_1$ is not less than the sum of the predetermined strong track threshold value TS and the predetermined strong SNR hysteresis value SH, then processor 18 proceeds to step 132 which is described in the ensuing description.

If in step 124, processor 18 determines that the value TQI(k−1) indicates a strong track, processor 18 proceeds to step 132. Processor 18 generates a value equal to the difference represented by TS−SH. In step 132, processor 18 determines if $SLLR_1$ is less than the difference TS−SH. If processor 18 determines that $SLLR_1$ is less than the difference TS−SH, processor 18 proceeds to step 128 to generate a value TQI(k) that indicates a low (SNR) track. However, if processor 18 determines that $SLLR_1$ is not less than the difference TS−SH, processor 18 proceeds to step 130 to generate a value TQI(k) that indicates a strong track.

The utilization of hysteresis to generate the TQI for each track update significantly improves the stability of the TQI data thereby providing a sonar operator with a clear indication of the current tracker state. Specifically, the utilization of hysteresis improves the stability of the TQI when there is a change in signal strength and the TQI transitions between states, when the tracker is initializing and locking onto a target, and when the signal strength is near a boundary between states such as strong and low track, or more importantly, when the tracker is near the lost track threshold.

Furthermore, the stability provided by hysteresis does not add any additional lag time or delay in determining that the track has been lost.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for calculating a track quality indicator from a plurality of tracker amplitude estimates comprising the steps of:

determining the track quality indicator at the previous time increment;

assigning the track quality indicator as a lost track based on a first lost track threshold if the track quality, indicator at the previous time increment indicated a lost track and based on a second lost track threshold if the track quality indicator at the previous time increment indicated a different status;

assigning the track quality indicator as an uncertain track based on a first uncertain track threshold if the track quality indicator at the previous time increment indicated a lost track or an uncertain track and based on a second uncertain track threshold if the track quality indicator at the previous time increment indicated a different status;

assigning the track quality indicator as a low signal to noise ratio (SNR) track based on a first low SNR track threshold if the track quality indicator at the previous time increment indicated a strong track and based on a second low SNR track threshold if the track quality indicator at the previous time increment indicated a different status;

assigning the track quality indicator as a strong track if another track quality indicator is not assigned; and continuing to the next time increment after the track quality indicator is assigned.

2. The method of claim 1 further comprising the steps of:

providing a base lost track threshold before any of the steps of assigning the track quality indicator;

providing a low SNR hysteresis constant before any of the steps of assigning the track quality indicator; and calculating a first summed log likelihood ratio (SLLR) from the tracker amplitude estimates at the current time increment before any of the steps of assigning the track quality indicator.

3. The method of claim 2 wherein the step of assigning the track quality indicator as a lost track comprises the steps of:

if the track quality indicator at a previous time increment indicates the track was lost then:

adding the base lost track threshold to the low SNR hysteresis constant to give a first lost track threshold;

comparing the calculated first SLLR with said first lost track threshold, if the calculated first SLLR is at most the first lost track threshold then indicating lost track at the track quality indicator, and if the calculated first SLLR is above the first lost track threshold then continuing determining the track quality indicator;

if the track quality indicator at a previous time increment indicates the track was not lost then:
using the base lost track threshold as a second lost track threshold; and
comparing the calculated first SLLR with said second lost track threshold, if the calculated first SLLR is at most the second lost track threshold then indicating lost track at the track quality indicator, and if the calculated first SLLR is above the second lost track threshold then continuing determining the track quality indicator.

4. The method of claim 2 further comprising the steps of:
providing a base uncertain track threshold; and
providing a maximum error threshold.

5. The method of claim 4 wherein the step of assigning the track quality indicator as an uncertain track comprises the steps of:
if the track quality indicator at the previous time increment indicates that the track was uncertain or lost then:
adding the base uncertain track threshold to the low SNR hysteresis constant to give a first uncertain track threshold;
comparing the calculated first SLLR with said first uncertain track threshold and if the calculated first SLLR is at most the first uncertain track threshold then indicating uncertain track at the track quality indicator;
if the track quality indicator at the previous time increment indicates that the track was low SNR track then:
using the base uncertain track threshold as the second uncertain track threshold;
comparing the calculated first SLLR with said second uncertain track threshold and if the calculated first SLLR is at most the second uncertain track threshold then indicating uncertain track at the track quality indicator;
if the calculated first SLLR is above the first and second uncertain track threshold then:
calculating a tracker error residual; comparing the tracker error residual with the maximum error threshold, if the tracker error residual is greater than the maximum error residual then indicating uncertain track at the track quality indicator and if the tracker error residual is less than the maximum error residual then continuing determining the track quality indicator.

6. The method of claim 1 further comprising the steps of:
computing a second summed log likelihood ratio (SLLR) from the tracker amplitude estimates at the current time increment before any of the steps of assigning the track quality indicator;
providing a strong track threshold; and
providing a strong SNR hysteresis constant.

7. The method of claim 6 wherein the step of assigning the track quality indicator as a low SNR track comprises the steps of:
if the track quality indicator at a previous time increment indicates the track was strong then:
subtracting the high SNR hysteresis constant from the strong track threshold to give a first low SNR track threshold;
comparing the calculated second SLLR with said first low SNR track threshold, if the calculated second SLLR is less than the first low SNR track threshold then indicating low SNR track at the track quality indicator, and if the calculated second SLLR is at least the first low SNR track threshold then indicating strong track at the track quality indicator;
if the track quality indicator at a previous time increment indicates the track was not strong then:
adding the high SNR hysteresis constant to the strong track threshold to give a second low SNR track threshold;
comparing the calculated second SLLR with said second low SNR track threshold, if the calculated second SLLR is less than the second low SNR track threshold then indicating low SNR track at the track quality indicator, and if the calculated second SLLR is at least the second low SNR track threshold then indicating strong track at the track quality indicator.

8. A method for calculating a track quality indicator from a plurality of tracker amplitude estimates comprising the steps of:
determining the track quality indicator at the previous time increment;
providing a base lost track threshold before any of the steps of assigning the track quality indicator;
providing a low SNR hysteresis constant before any of the steps of assigning the track quality indicator;
calculating a first summed log likelihood ratio (SLLR) from the tracker amplitude estimates at the current time increment before any of the steps of assigning the track quality indicator;
providing a base uncertain track threshold;
providing a maximum error threshold;
computing a second summed log likelihood ratio (SLLR) from the tracker amplitude estimates at the current time increment before any of the steps of assigning the track quality indicator;
providing a strong track threshold;
providing a strong SNR hysteresis constant;
if the track quality indicator at a previous time increment indicates the track was lost then:
adding the base lost track threshold to the low SNR hysteresis constant to give a first lost track threshold;
comparing the calculated first SLLR with said first lost track threshold, if the calculated first SLLR is at most the first lost track threshold then indicating lost track at the track quality indicator, and if the calculated first SLLR is above the first lost track threshold then continuing determining the track quality indicator;
if the track quality indicator at a previous time increment indicates the track was not lost at said previous time then:
using the base lost track threshold as a second lost track threshold; and
comparing the calculated first SLLR with said second lost track threshold, if the calculated first SLLR is at most the second lost track threshold then indicating lost track at the track quality indicator, and if the calculated first SLLR is above the second lost track threshold then continuing determining the track quality indicator;
if the track quality indicator at the previous time increment indicates that the track was uncertain or lost then:
adding the base uncertain track threshold to the low SNR hysteresis constant to give a first uncertain track threshold;

comparing the calculated first SLLR with said first uncertain track threshold and if the calculated first SLLR is at most the first uncertain track threshold then indicating uncertain track at the track quality indicator;

if the track quality indicator at the previous time increment indicates that the track was low SNR track then:
using the base uncertain track threshold as the second uncertain track threshold;
comparing the calculated first SLLR with said second uncertain track threshold and if the calculated first SLLR is at most the second uncertain track threshold then indicating uncertain track at the track quality indicator;

if the calculated first SLLR is above the first and second uncertain track threshold then:
calculating a tracker error residual;
comparing the tracker error residual with the maximum error threshold, if the tracker error residual is greater than the maximum error residual then indicating uncertain track at the track quality indicator and if the tracker error residual is less than the maximum error residual then continuing determining the track quality indicator;

if the track quality indicator at a previous time increment indicates the track was strong then:
subtracting the high SNR hysteresis constant from the strong track threshold to give a first low SNR track threshold;
comparing the calculated second SLLR with said first low SNR track threshold, if the calculated second SLLR is less than the first low SNR track threshold then indicating low SNR track at the track quality indicator, and if the calculated second SLLR is at least the first low SNR track threshold then indicating strong track at the track quality indicator;

if the track quality indicator at a previous time increment indicates the track was not strong then:
adding the high SNR hysteresis constant to the strong track threshold to give a second low SNR track threshold;
comparing the calculated second SLLR with said second low SNR track threshold, if the calculated second SLLR is less than the second low SNR track threshold then indicating low SNR track at the track quality indicator, and if the calculated second SLLR is at least the second low SNR track threshold then indicating strong track at the track quality indicator.

* * * * *